US010216746B1

(12) United States Patent
Tummala et al.

(10) Patent No.: US 10,216,746 B1
(45) Date of Patent: Feb. 26, 2019

(54) MANAGING FILE SYSTEM ACCESS TO REMOTE SNAPSHOTS

(71) Applicant: EMC Corporation, Hopkinton, MA (US)

(72) Inventors: Himabindu Tummala, South Grafton, MA (US); Jean-Pierre Bono, Westborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 439 days.

(21) Appl. No.: 14/788,775

(22) Filed: Jun. 30, 2015

(51) Int. Cl.
*G06F 7/00* (2006.01)
*G06F 17/00* (2006.01)
*G06F 17/30* (2006.01)

(52) U.S. Cl.
CPC ...... *G06F 17/30085* (2013.01); *G06F 17/302* (2013.01); *G06F 17/30088* (2013.01); *G06F 17/30168* (2013.01); *G06F 17/30221* (2013.01)

(58) Field of Classification Search
CPC ......... G06F 17/30085; G06F 17/30088; G06F 17/30168; G06F 17/302; G06F 17/30221
See application file for complete search history.

(56) References Cited

U.S. PATENT DOCUMENTS

| 8,706,833 | B1* | 4/2014 | Bergant | G06F 17/30215 709/214 |
|---|---|---|---|---|
| 9,274,897 | B2* | 3/2016 | Clifford | G06F 11/1451 |
| 2004/0260736 | A1* | 12/2004 | Kern | G06F 11/2058 |
| 2010/0275264 | A1* | 10/2010 | Masuyama | G06F 21/6236 726/26 |
| 2015/0172120 | A1* | 6/2015 | Dwarampudi | G06F 3/06 709/221 |
| 2016/0378525 | A1* | 12/2016 | Bjorkengren | G06F 9/45558 718/1 |

* cited by examiner

*Primary Examiner* — Azam M Cheema
(74) *Attorney, Agent, or Firm* — Krishnendu Gupta; Jason Reyes; Anne-Marie Dinius

(57) ABSTRACT

A technique for managing snaps of data objects is disclosed. Managing snaps of a data object hosted by a source data storage system (source) involve specifying, by the source, a set of policies for snaps of the data object stored on a destination data storage system (destination). The set of policies include a remote access policy information to designate a destination snaps as remote access enabled. The policy information is transferred to the destination enabling policy implementation on destination snaps. Destination snaps designated as remote access enabled are associated with a SCSI target at the destination. A virtual volume having virtual snaps associated with corresponding remote access enabled destination snaps is created at the source. The virtual volume is configured as a SCSI initiator, and exposed to a host providing access of destination snaps at the source; the source and destination are file systems implementing checkpoint functionality.

11 Claims, 9 Drawing Sheets

MANAGING FILE SYSTEM ACCESS TO REMOTE SNAPSHOTS

BACKGROUND

Technical Field

This application relates generally to managing file system access to remote snapshots.

Description of Related Art

Data storage systems are arrangements of hardware and software that include storage processors coupled to arrays of non-volatile storage devices. In typical operation, storage processors service storage requests that arrive from client machines. The storage requests specify data objects (e.g., file systems, LUNs, vVols, and the like) to be accessed, overwritten, created, or deleted, for example. The storage processors run software that manages incoming storage requests and performs various data processing tasks to organize and secure the data stored on the non-volatile storage devices.

Data storage systems may implement snapshot technology to protect the data objects they store. For example, a data storage system may present a data object to a host machine. The host machine accesses the data object and can make changes to its contents over time. To protect the data object and its state at various points in time, the data storage system may take snapshots, or "snaps," of the data object at regular intervals or in response to user commands or particular events. Each snap provides a point-in-time version of the data object that users of host machines can access to restore from a previous version of the data object, such as to resume use of the data object from a previous, known-good state. Users may also restore from snaps to examine previous states of a data object, such as for historical or forensic purposes.

Data storage systems typically manage snaps and allow host machines to create, access, and delete snaps as needed. To this end, data storage systems may create and store attributes of snaps to facilitate their administration and control Attributes of snaps may include, for example, snap labels, retention policy, and whether snaps are read-only or read/write.

SUMMARY OF THE INVENTION

A technique for managing snaps of data objects is disclosed. Managing snaps of a data object hosted by a source data storage system (source) involve specifying, by the source, a set of policies for snaps of the data object that are stored on a destination data storage system (destination). The set of policies include a remote access policy information to designate a destination snaps as remote access enabled. The policy information is transferred to the destination to enable policy implementation on destination snaps. Destination snaps designated as remote access enabled are associated with a SCSI target at the destination. A virtual volume having virtual snaps associated with corresponding remote access enabled destination snaps is created at the source, where the virtual volume is configured as a SCSI initiator. The virtual volume is exposed to a host to provide access of destination snaps at the source, wherein the source and destination are file systems implementing checkpoint functionality.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Improved techniques for managing snaps of a data object hosted by the source involve specifying, by the source, a set of policies for snaps of the data object that are stored on the destination. Advantageously, the improved techniques allow a host to transparently access local and remote file system objects at a source storage system. Such control promotes various efficiencies and system performance improvements that would not be easily realized if a host could not access destination storage objects from a source.

Figure 1:
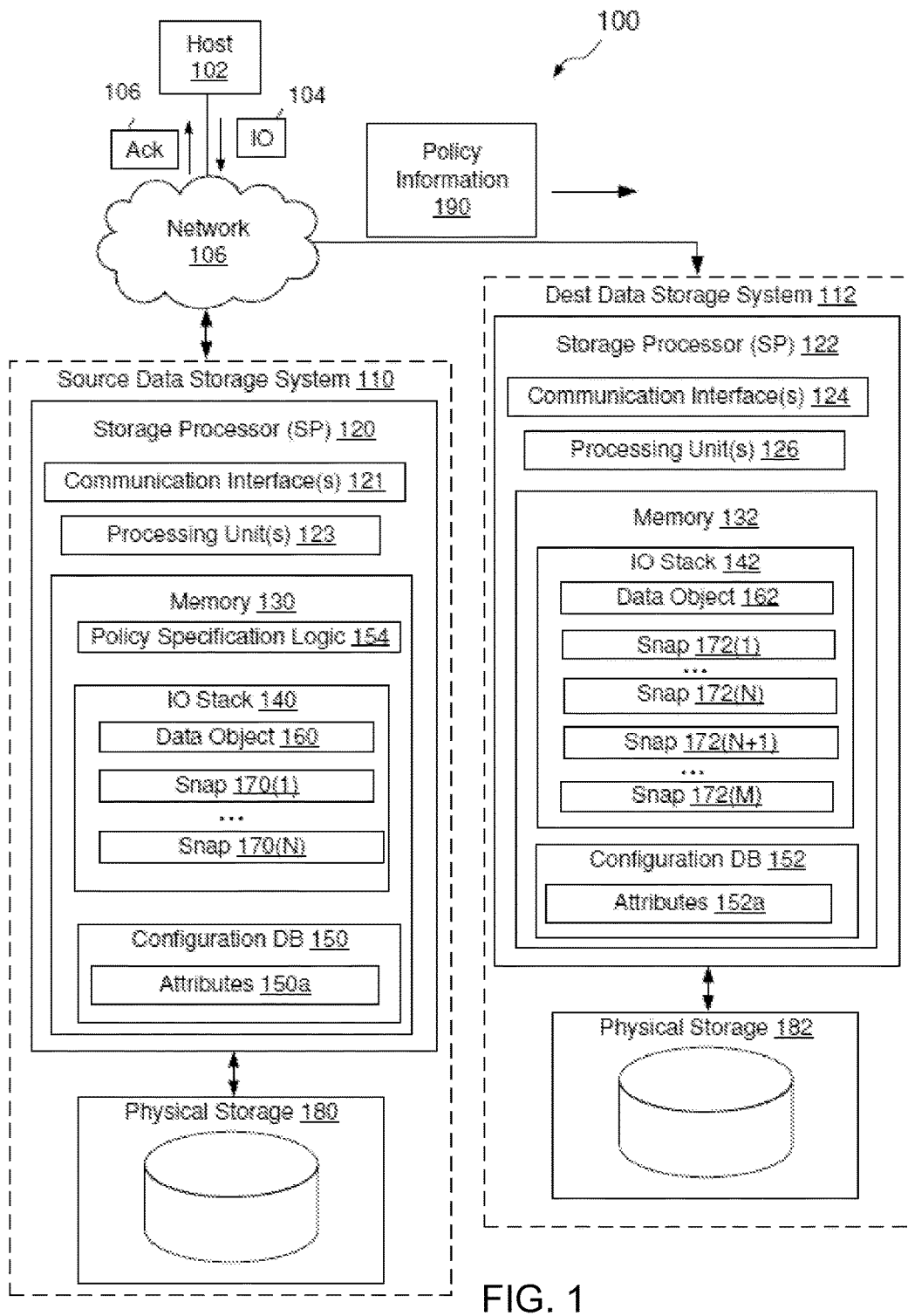
FIG. 1 is a block diagram illustrating an example electronic environment in which the improved technique can be carried out.

FIG. 1 shows an example electronic environment 100 in which embodiments of the improved techniques hereof can be practiced. Here, a host computing device ("host") 102 accesses a source data storage system 110 ("source") over a network 106. The source 110 includes a storage processor, or "SP," 120 and non-volatile storage 180. The storage 180 is provided, for example, in the form of hard disk drives and/or electronic flash drives. The source 110 may include multiple SPs like the SP 120. In an example, multiple SPs may be provided as circuit board assemblies, or "blades," which plug into a chassis that encloses and cools the SPs. The chassis has a backplane for interconnecting the SPs, and additional connections may be made among SPs using cables. It is understood, however, that no particular hardware configuration is required, as any number of SPs (including a single one) can be provided and the SP 120 can be any type of computing device capable of processing host IOs. Additional information about data storage systems in which the improved technique hereof can be practiced is found in U.S. patent application Ser. No. 13/828,322, filed Mar. 14, 2013, the contents and teachings of which are incorporated by reference herein in their entirety.

The network 106 can be any type of network or combination of networks, such as a storage area network (SAN), local area network (LAN), wide area network (WAN), the Internet, and/or some other type of network, for example. In an example, the host 102 can connect to the SP 120 using various technologies, such as Fibre Channel (e.g., through a SAN), iSCSI, NFS, SMB 3.0, and CIFS. Any number of hosts 102 may be provided, using any of the above protocols, some subset thereof, or other protocols besides those shown. The SP 120 is configured to receive IO request 104 and to respond to such IO requests 104 by reading and/or writing the non-volatile storage 180 and sending an acknowledgment 108.

The SP 120 is seen to include one or more communication interfaces 121, a set of processing units 123, and memory 130. The communication interfaces 121 include, for example, SCSI target adapters and network interface adapters, for converting electronic and/or optical signals received from the network 106 to electronic form for use by the SP 120. The set of processing units 123 include one or more processing chips and/or assemblies. In a particular example, the set of processing units 124 includes numerous multi-core CPUs. The memory 130 includes both volatile memory (e.g., RAM), and non-volatile memory, such as one or more ROMs, disk drives, solid state drives, and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as an operating system, various applications, processes, and daemons, for example.

The memory 130 is seen to include (i.e., realize by operation of programming code) an IO stack 140 and policy specification logic 154. The IO stack 140 provides an execution path for host IOs (e.g., IO request 104). The policy specification logic 154 is a software construct configured to cause SP 120 to carry out policy specification operations.

The IO stack 140 includes a data object 160, e.g., a file system, a LUN, a vVol, or the like, as well as associated snaps 170(1), . . . , 170(N) of the data object 160. The snaps 170(1), . . . , 170(N) each represent a point-in-time version of the data object 160. It should be understood that the data object 160 and associated snaps 170(1) . . . 170(N) are logical constructs within the IO stack 140 and that the underlying data and metadata that support these structures typically reside in the storage 180. Although only a single data object and associated snaps are shown, it should be understood that SP 120 may host any number of data objects, like data object 160, and their associated snaps, limited only by available computing and storage resources.

Policy specification logic 154 causes SP 120 to establish policy data that specifies policies to be implemented on each snap on the source 110. For example, there may be a retention policy dictating that snaps created on the source 110, such as snaps 170(1), . . . , 170(N), be retained in storage 180 for at least a specified time, e.g., 30 days. In response to generation of a new snap, policy specification logic 154 causes SP 120 to store such retention times in memory 130. In some arrangements, SP 120 stores policy data 190 in a configuration database 150 that associates snap identifiers with respective policies.

The source 110 is also seen to be in communication with a destination data storage system ("destination") 112 over the network 106. As shown in FIG. 1, the destination 112 is structured similarly to the source 110, although this is by no means a requirement. For example, the destination 112 includes one or more communication interfaces 124, a set of processing units 126, memory 132, and non-volatile storage 182. The memory 132 is seen to include an IO stack 142, which in turn includes a data object 162 (which itself may be a snap) and associated snaps 172(1), . . . , 172(N), 172(N+1), . . . , 172(M) of the data object 162.

It should be understood that the snaps 172(1), . . . , 172(N) are respective mirrors of the snaps 170(1), . . . , 170(N). Also, the data object 162 on the destination 112 represents a point-in-time version of the data object 160. In an example, the data object 160 is a live, production object that is continually begin updated, whereas the data object 162 may be a point-in-time snap of the data object 160. The data object 160 and snaps 170(1), . . . , 170(N) are stored in physical storage 180, whereas the data object 162 and snaps 172(1), . . . , 172(N) are stored in physical storage 182. Thus, the physical storage supporting the data object and its snaps on the source 110 is independent of the physical storage supporting the data object and snaps on the destination 112.

The destination 112 may also store snaps 172(N+1), . . . , 172(M). In an example, snaps 172(N+1), . . . , 172(M) are mirrors of snaps of the data object 160 at the source 110 that have since been removed from the source 110. Thus, for example, the destination 112 may be used for snap archiving and may retain snaps for a longer period of time than does the source 110.

During operation, SP 120 establishes policy information 190 that specifies a set of policies to be implemented at the destination 112, e.g., on snaps 172(1), . . . , 172(N), 172(N+1), . . . , 172(M) of the data object 162. The set of policies may be expressed as attributes 150a and may be provided on a per-snap basis and/or altogether for all snaps. For example, one such policy may specify a retention policy for a snap, e.g., for requiring the snap to be retained on the destination 112 for a minimum amount of time. Other policies may relate to activities to be performed on the snaps at the destination. Yet other policies may describe how the destination 112 stores the data object 162 and snaps 172(1-M), e.g., whether their data may be compressed or subject to de-duplication.

After SP 120 establishes the policy information 190, SP 120 transfers the policy information 190 to the destination 112 over the network 106. Upon receipt of the policy information 190, the destination 112 stores the policy information 190 in memory 132. For example, the SP 122 stores policy information and attributes 152a in a configuration database 152. The destination 112 may then implement the set of policies specified by the policy information 190 on the snaps 172(1), . . . , 172(N), 172(N+1), . . . , 172(M).

Figure 2:
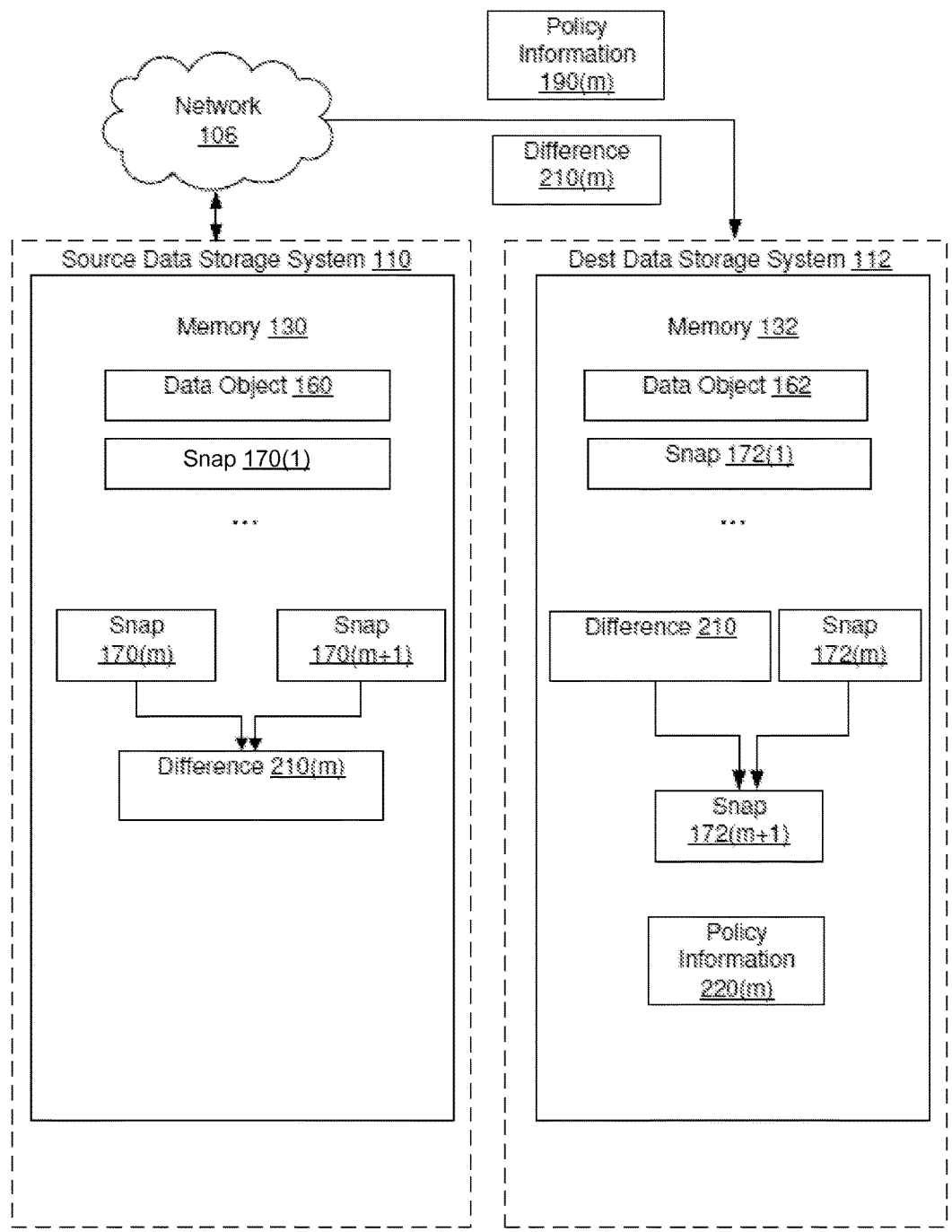
FIG. 2 is a block diagram illustrating an example transfer of policy information in the electronic environment of FIG. 1.

FIG. 2 illustrates an example configuration of the source 110 and destination 112 by which policy information may be transferred. In this configuration, the SP 120 is configured to transfer policy information from source to destination on a per-snap basis. Here, the source 110 stores a data object 160 and associated snaps 170(1), . . . , 170(M). Further, the destination 112 stores a mirrored data object 162 and associated snaps 172(1), . . . , 172(M). It should be understood that snap 172(k) contains the same data as in snap 170(k), and so on.

During operation, SP 120 (FIG. 1) generates a new snap 170(M+1) on the source 110 and policy information 220(M) specific to that snap. In order to mirror the new snap 170(M+1) to the destination 112, SP 120 forms a difference 210(M) between new snap 170(M+1) and previous snap 170(M). The difference 210(M) includes a list of blocks that differ between the two snaps.

After forming the difference 210(M), the SP 120 sends the difference 210(M) to the destination 112 over the network 106. In an example, the destination 112 is configured as a target of snapshot-shipping replication for the data object 160 on the source 110. In this case, the SP 120 sends the difference 210(M) to the destination 112 as part of a snapshot-shipping replication operation. More information about generating snaps across replication sites may be found in copending U.S. patent application Ser. No. 14/319,622, filed Jun. 30, 2014, the contents and teachings of which are hereby incorporated by reference in their entirety.

When sending the difference 210(M) to the destination 112 over the network 106, the SP 120 also sends the policy information 220(M). For example, the source 110 may send the policy information 220(M) along with a payload of snapshot-shipping metadata sent with the difference 210(M). When the destination 112 receives the difference 210(M) and the policy information 220(M), the destination 112 creates a new destination snap 172(M+1) and applies the policy information 220(M) to the new snap.

The SP 122 (FIG. 1) on the destination 112 creates the new destination snap 172(M+1) as a mirror of the new snap 170(M+1) on the source 110. In one example, the SP 122 forms new destination snap 172(M+1) by adding the difference 210(M) to the previous destination snap 172(M). In another example, the SP 122 applies the difference 210(M) to the data object 162, to bring the data object 162 into a content-consistent state with the snap 170(M+1). The SP 122 then generates the new destination snap 172(M+1) as a snap of the data object 162.

When the SP 122 receives the difference 210(M), the SP 122 stores the policy information 220(M) in the memory 132. For example, the SP 122 may store the policy information 220(M) in entries in the configuration database in the memory 132. Each entry may include an identifier of the new mirrored snap 172(M+1) and values describing policies to be applied to the new mirrored snap 172(M+1).

Figure 3:
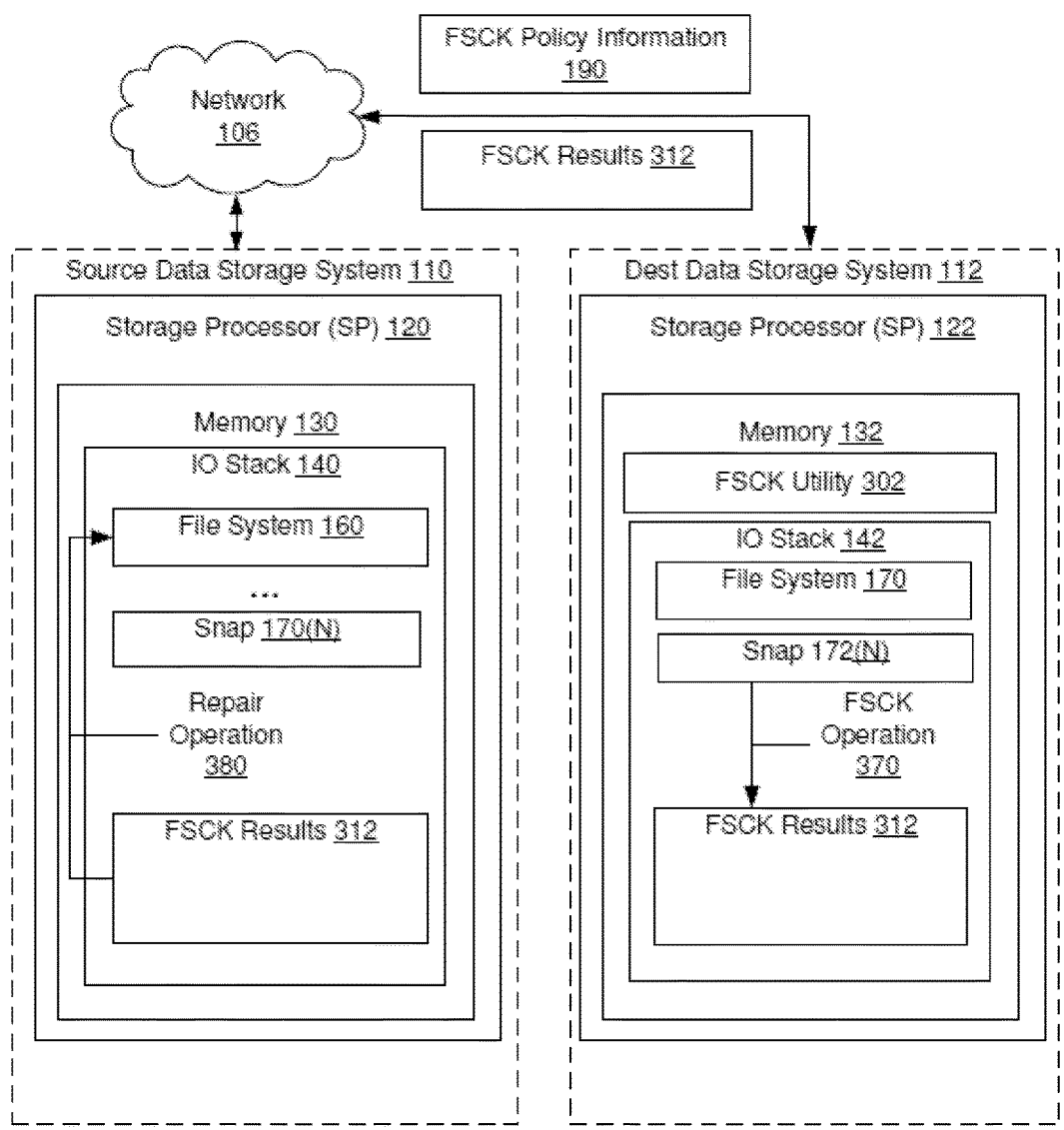
FIG. 3 is a block diagram illustrating an example file system consistency check operation in the electronic environment of FIG. 1.

FIG. 3 illustrates an example configuration of the source 110 and the destination 112 for performing a file system consistency check. Here, the data object is a file system and the policy information sent when mirroring a snap from source 110 to destination 112 specifies that the destination 112 is to perform a file system consistency check. As is known, a file system consistency check (FSCK) is a process for checking a file system (or a snap thereof) for inconsistencies in file system metadata. FSCK operations may generate pass or fail results, identify errors, and suggest repairs. Because file systems may be large and FSCK may take considerable time to run, it may be beneficial for the source 110 to specify that the destination 112 perform FSCK on a snap of the data object at the destination 112, rather than for the source, which may already be busy servicing IOs, to also be burdened with having to perform FSCK locally. In the example of FIG. 3, the source 110 may specify an FSCK policy for a snap, and the destination may implement the policy once the snap has been mirrored to the destination. The destination 112 may then run FSCK locally, if the FSCK policy requests that it do so, and report results back to the source 110.

In the configuration shown in FIG. 3, destination 112 includes an FSCK utility within memory 132. FSCK utility 132 contains instructions that cause the SP 122 to perform an FSCK operation 370 on one of the mirrored snaps 172(1), . . . , 172(N). It is advantageous for the SP 122 to perform the FSCK operation 370 on a mirrored snap because the SP 120 is free to continue normal operation even as the FSCK operation 370 is performed on the destination snap 172(N).

The FSCK policy information 190 may indicate an event at which the SP 122 performs the FSCK operation 370 on the snap 172(N), e.g., upon creation, every year, in response to various errors indicating a corrupted file system, and so on.

During an example operation, SP 120 establishes FSCK policy information 190 as part of the establishment of other policies such as retention in response to the creation of snap 170(N). SP 120 then sends FSCK policy information 190 to the destination 112 over network 106 as described above in connection with FIG. 2.

The FSCK operation 370 produces a set of FSCK results 312. In some arrangements, the FSCK results 312 include information about metadata within the snap 172(N) that were found to be inconsistent with other metadata within the snap 172(N).

Upon completion of the FSCK operation 370, the SP 122 sends the FSCK results 312 to the source 110 over the network 106. Upon receipt of the FSCK results 312, the SP 120 stores the FSCK results 312 in the memory 130. The SP 120 on the source 110 may then initiate a repair operation 380 on the file system 160. That is, rather than disrupt normal storage processing by running an FSCK operation on the source 110, the SP 120 merely applies the FSCK results 312 to the file system 160, resulting in a much faster and less disruptive repair process.

At some point, the file system 160 may start behaving unexpectedly or show signs of damage or corruption. When this occurs, the source 110 may check the FSCK results 312 to identify a last known-good snap of the file system 160. The source 110 may then perform a restore operation, to copy the last known-good destination snap back to the source and to resume operations using that snap as the production object. Although some data loss may occur, data availability can be restored quickly, with little disruption to hosts.

Figure 4:
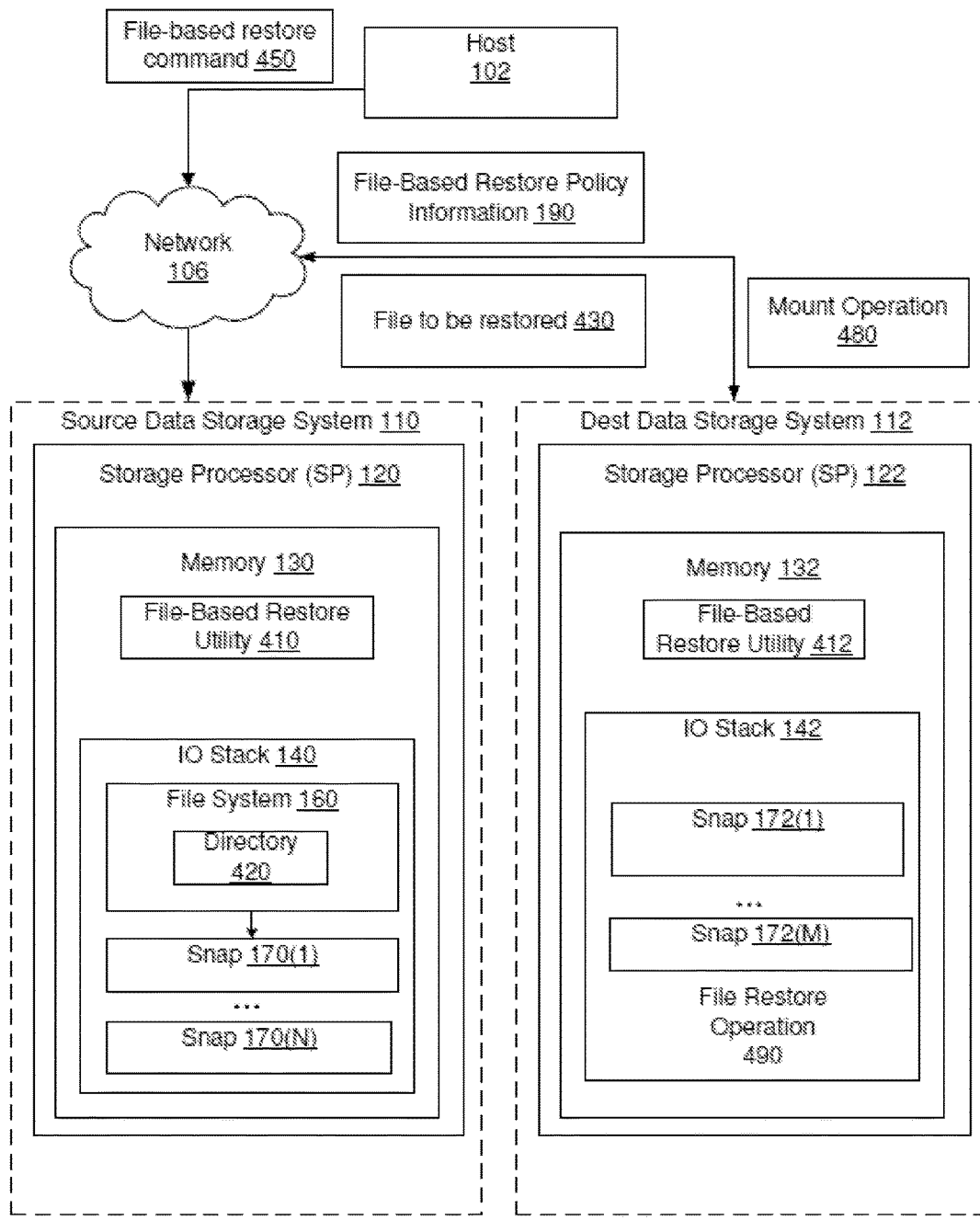
FIG. 4 is a block diagram illustrating an example file-based restore operation in the electronic environment of FIG. 1.

FIG. 4 illustrates an example configuration of the source 110 and the destination 112 for enabling a file-based restore operation to be performed using a snap at the destination 112. Here, the data object 160 is a file system. The file-based restore operation, when performed on a snap 172(1) at the destination, is configured to restore a specified file of a snap 172(1) in the destination 112 to the file system 160.

In the configuration shown in FIG. 4, the source 110 and the destination 112 each have a respective file-based restore utility 410 and 412. In many cases, only the source needs to have the file-based restore utility in order to effect the file-based restore operation 490. File-based restore utility 410 contains instructions that cause the SP 120 to perform a file-based restore operation 490 on a snap 172(1) in the destination 112.

In this example, the file-based restore operation 490 occurs in two parts. First, a user at the host 102 issues a request to the source 110 to perform a file-based restore operation to restore a file to a directory 420 in file system 160. For example, the user may issue a command 450 while viewing the directory 420 from the host 102. In response, the source 110 returns a list of snaps 172(1), . . . , 172(M) in the destination 112 that contain the directory 420. In some arrangements, the list also includes snaps 170(1), ..., 170(N) in the source 110 that include the directory 420. In some examples, snaps that do not include the directory 420 are excluded from the list. Second, the user selects one of the snaps on the list and selects a file 430 or multiple files to be restored from the directory 420. The SP 120 then restores the file 430 to the directory 420 in the file system 160.

The file-based restore policy information 190 indicates whether the SP 120 should include particular destination snaps in the list of snaps returned to the host 102. For example, the destination 112 may store hundreds or thousands of snaps that all include the directory 420, such that it is impractical for the list to include all of them. Thus, in one example, the source 110 may provide the policy information 190 as an attribute on a per-snap basis, with the attribute set to TRUE to include the snap in file-based restore operations or to FALSE to exclude it. Because the number of snaps may be large, another option is to specify the policy information 190 on a per-data-object basis, which applies to all snaps of the data object, rather than on a per-snap basis. The attribute may specify, for example, that only a specified percentage of snaps be made available for file-based restore operations. The destination 112, upon receiving the policy information 190, may then apply attributes to individual snaps, e.g., in the configuration database, to implement the specified policy, such that individual snaps are either included in file-based restore operations or not. For example, if the policy information 190 specifies that 10% of snaps should be included in file-based restore operations initiated from the source 110, then the destination 112 may set a file-based restore attribute to TRUE for one out of ten snaps and may set the same attribute to FALSE for nine out of ten.

During operation, the SP 120 establishes the file-based restore policy information 190 for a snap, for example, 172(1). Sometime later, the SP 120 receives a request 450 from the host 102 to perform the file-based restore operation 490 specifying the directory 420 of the file system 160. In response, the SP 120 determines which of the snaps 172(1), ..., 172(M) in the destination 112 should be included in the file-based restore operation 490 based on the value of the attribute of each of the snaps. The file-based restore utilities 410 and 412 then coordinate to generate the list of snaps, e.g., by mounting both source and destination snaps having the attribute set, identifying mounted snaps that include the directory 420, and returning a list of the identified snaps to the host 102. If a selection is made to restore from a destination snap, the file-based restore utilities 410 and 412 again coordinate to copy selected file or files in the directory 420 of the selected snap back to the source 110, where they are restored to the directory 420 in the file system 160. If a selection is made to restore from a source snap, the file-based restore utility 410 performs the restore locally.

It should be understood that an advantage of performing such a file-based restore in this way is that the user at the host 102 does not need to worry about whether a snap is in the source 110 or the destination 112. The user simply sees is a single list of snaps that have the directory 420, from which the user may select a snap having the file 430. Also, as destination snaps may extend significantly further back in time than source snaps, it may be more likely that user will be able to restore old files of old versions of files than if file-based restore were limited only to the source.

Figure 5:
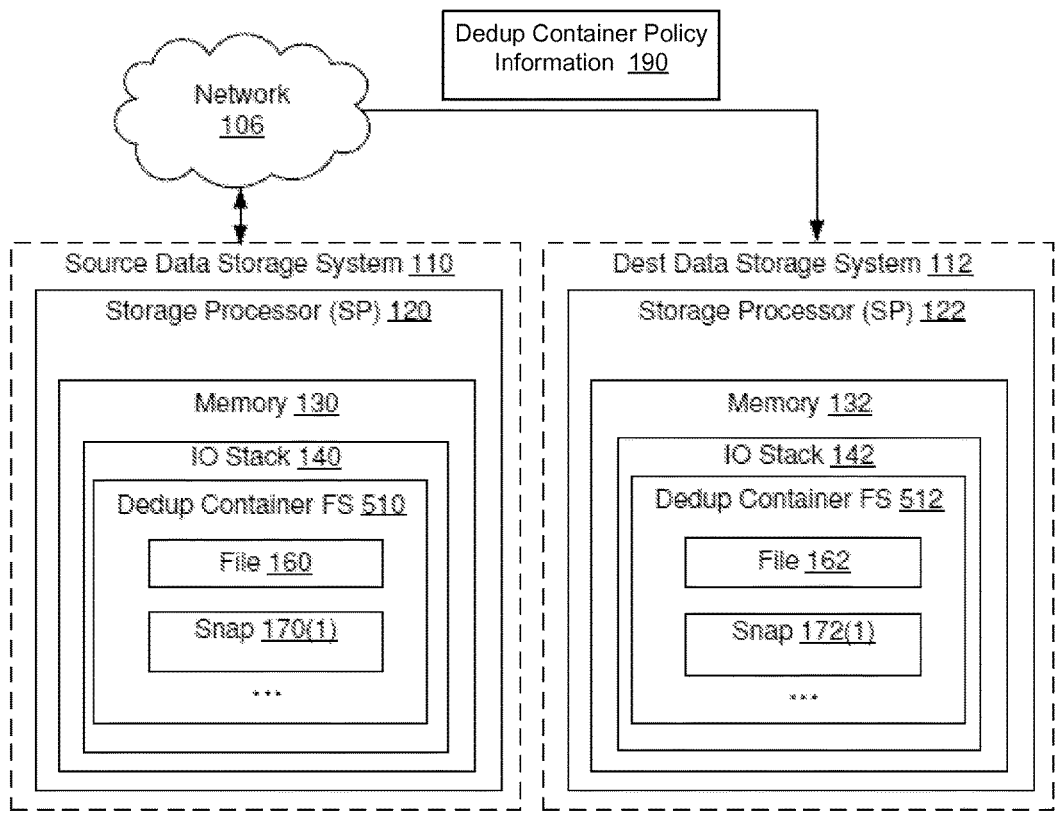
FIG. 5 is a block diagram illustrating example deduplication container file systems in the electronic environment of FIG. 1.

FIG. 5 illustrates an example configuration in which the data object 160 in the source 110 is a container file representing a data object, such as a host file system (HFS), a virtual volume (vVol), or a LUN, realized in a container file system 510. In this example, container file system 510 is a deduplication container file system supporting deduplication operations. The SP 120 may host any number of such container file systems, although only one container file system is shown. The container file system 510 includes an inode structure including an inode and indirect blocks. The inode provides file-specific information about the container file 160 in the container file system 510. The inode structure includes location information (i.e., locations of data blocks) where data of the file are stored. It should be understood that any container file system might contain multiple files, with each having its own entry in a respective inode table. Here, each container file system stores not only the container file 160 representing a data object, but also associated snaps 170(1), ..., 170(N) of the container file 160.

In this example configuration, the destination 112 also contains a container file system 512 in which a container file 162 is realized. In this case, however, the container file 162 is a mirror of the container file 160 and the snaps 172(1), ..., 172(N) are mirrors of the respective snaps 170(1), ..., 170(N).

The policies specified by dedup container policy information 190 indicate a configuration of the container file system 512. It should be understood that the SP 120 establishes the dedup container policy information 190 prior to mirroring the container file 160 to create the mirrored container file 162 in the destination 112. In the example shown in FIG. 5, the container file system 510 supports deduplication operations. Then the policies dictate that the container file system 512 will also support deduplication operations, e.g., generate data structures for each data block of the container file 162 and its associated snaps 172(1), ..., 172(N) in order to facilitate deduplication operations on that data block.

Figure 6:
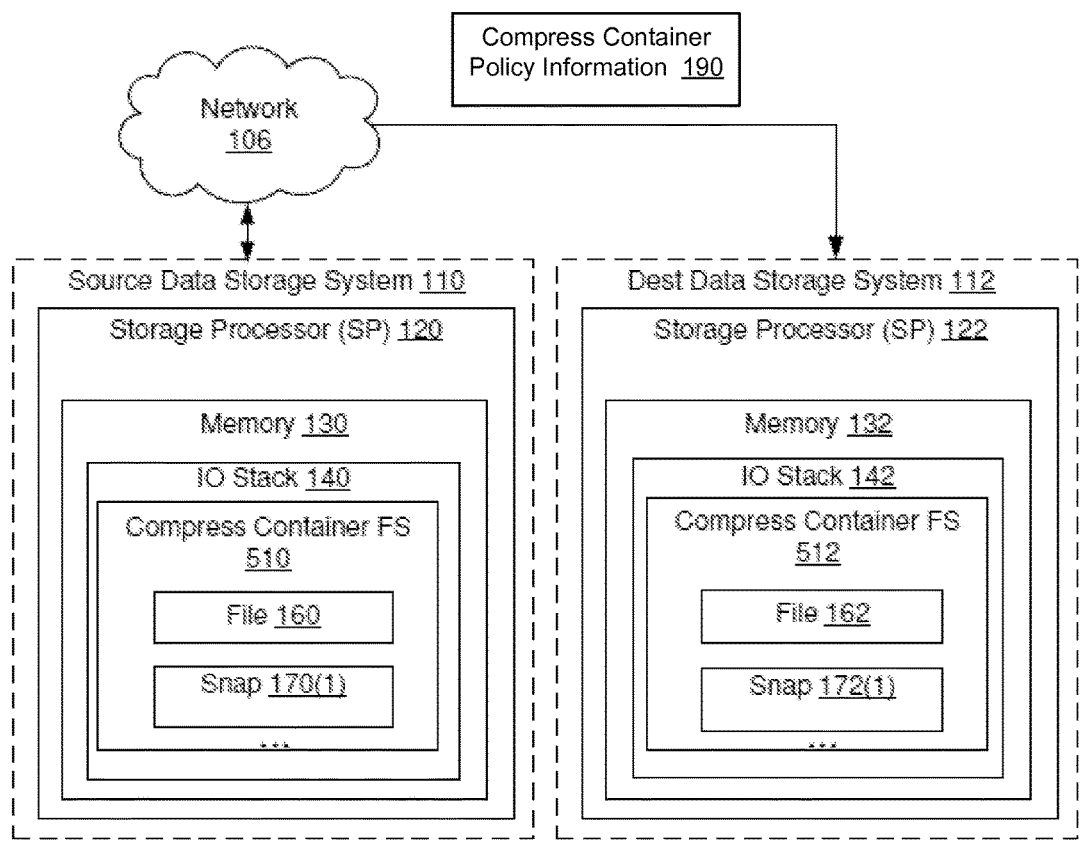
FIG. 6 is a block diagram illustrating example compression operations in the electronic environment of FIG. 1.

FIG. 6 illustrates further examples of mirroring data objects realized in container files and associated snaps. Here, the container file system 510 on source 110 supports compression operations.

In this example, an attribute value describing the policies specified by compress container policy information 190 dictate that the destination 112 build the container file system 512 to support compression operations. In this way, the policies enable the container file system 512 to support compression operations.

Figure 7:
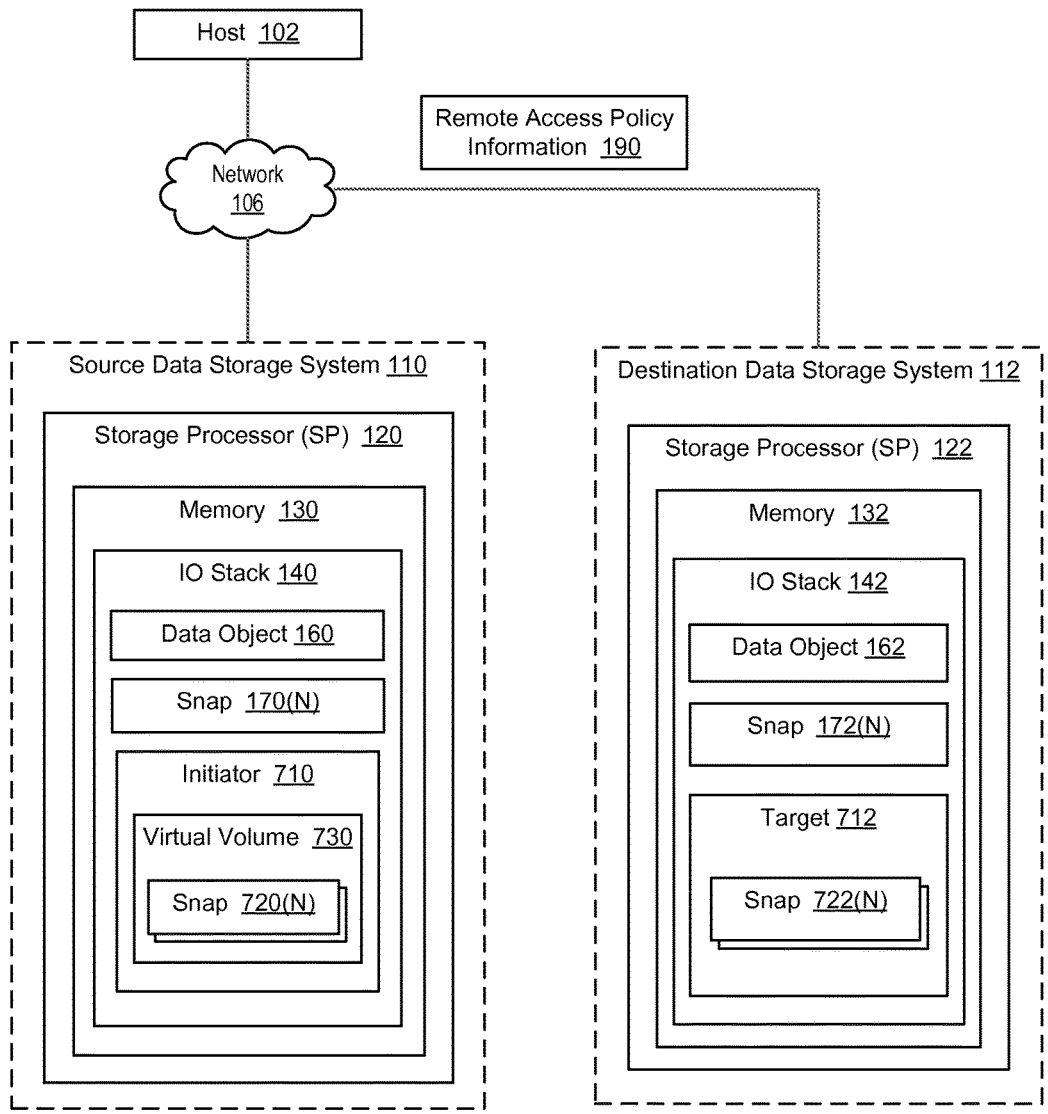
FIG. 7 is a block diagram illustrating example remote snap access policy in the electronic environment of FIG. 1.

FIG. 7 illustrates an example configuration of the source 110 and the destination 112 and techniques related thereto for enabling volume abstraction on the source 110. Volume abstraction provides a mechanism where a source 110 virtual volume 730 that appears and functions as if it is a local volume can be exposed to a host 102 application; however, underlying IO operations for the source 110 virtual volume 730 are redirected to a destination 112 volume. As a result, a host 102 user application initiating IO operations with the source storage system 110 can transparently access backup data, such as a destination snap 722(N), located on a destination storage system 112 as if the snap 722(N) was stored locally on the source 110 using a virtual snap 720(N).

In this configuration example, source 110 includes a SCSI initiator 710 (also referred to as simply "initiator") and the destination 112 includes a SCSI target 712 (also referred to as simply "target"), where the source is configure as a SCSI initiator for a target volume at the destination 112.

A SCSI system contains at least a SCSI initiator and a SCSI target. The SCSI initiator initiates communication with the SCSI target in a SCSI system. In a SCSI system, a SCSI initiator initiates a communication session with an IO request directed to the SCSI target. The SCSI target responds to the request to perform operations such as read, write, xcopy (extended copy), and etc. A data storage system 110 can be a SCSI initiator and a SCSI target at the same time for different SCSI sessions. For example, source 110 is a SCSI target when host 102 sends over data to primary source 110 for backup. Yet source 110 can be a SCSI initiator when it sends over data to destination 112 for backup. Similarly, destination 112 can be a SCSI initiator when it sends over data to source 110 for recovery, for example. Without being noted otherwise, embodiments of the invention can be implemented for communications between host 102 and source 110, and between source 110 and destination 112. Indeed, embodiments of the invention can be implemented in any SCSI system containing a SCSI initiator and a SCSI target.

The remote access policy information 190 establishes which particular destination snaps should be made available for remote access to the source 110 for eventual exposure to the host 102. For example, the remote access policy information 190 may indicate that the 8 most recent snaps are to be designated as remote access enabled. In this way, remote access designated snaps can be made available to the source 110 by creating a relationship with the virtual volume's 730 snaps 720(N) by appropriate configuring a SCSI initiator/target relationship. When a new snap is received from the source 110 at the destination 112, a round robin process may be used to remove the oldest snap and add the newly received snap. Alternatively, or in addition, other criteria for selecting which snaps are to be made remotely available may be similarly implemented.

In operation, the source SP 120 may establish remote access policy information 190, alone or as part of the establishment of other policies (e.g., retention), in response to the creation of snap 170(N). SP 120 then sends remote access policy information 190 to the destination 112 over network 106 in a manner as was described above. The destination SP 122 is directed to derive snap information from the remote access policy information 190 which is then used to identify and designate snaps for remote access enablement. The identified snaps are associated with or added to the destination target 712. On the source 110, the virtual volume 730 is exposed as a SCSI initiator 710. As a result, the SCSI target 712 and SCSI initiator 710 relationship effectively communicatively couples destination snaps 722(N) to source virtual snaps 720(N). Once this relationship is established, the virtual volume 730 can be exposed to the host 102. Subsequent host IO operations directed to the virtual snaps 720(N) are redirected to a corresponding destination snaps 722(N) in a manner that is transparent to the host.

Thus, host 102 applications can initiate IO operations to snaps on the source 110, where the source 110 may include source local snaps 170(N) as well as virtual snaps 720(N) residing at a destination 112 in a manner transparent to the host application. As a result, the host 102 can access remote snaps residing on the destination 112 in the same manner as when accessing local snaps residing on the source 110. Advantageously, fewer local snaps 170(N) may be stored at the source 110 freeing up source 110 resources for other tasks such as servicing user application 10. Further, because the virtual snaps 720(N) consume a negligible amount of memory as compared to local snaps 170(N), a source may be configured to effectively provide access to a much larger number snaps using the volume abstraction techniques described herein. It should be noted that the aforementioned techniques are equally applicable to different storage object types including, but not limited to, file system files, LUNs, objects, CAS, etc. Further, the remote access techniques described herein may be used, or modified for use, with one or more of the various techniques described above in reference to FIGS. 1-6.

Figure 8:
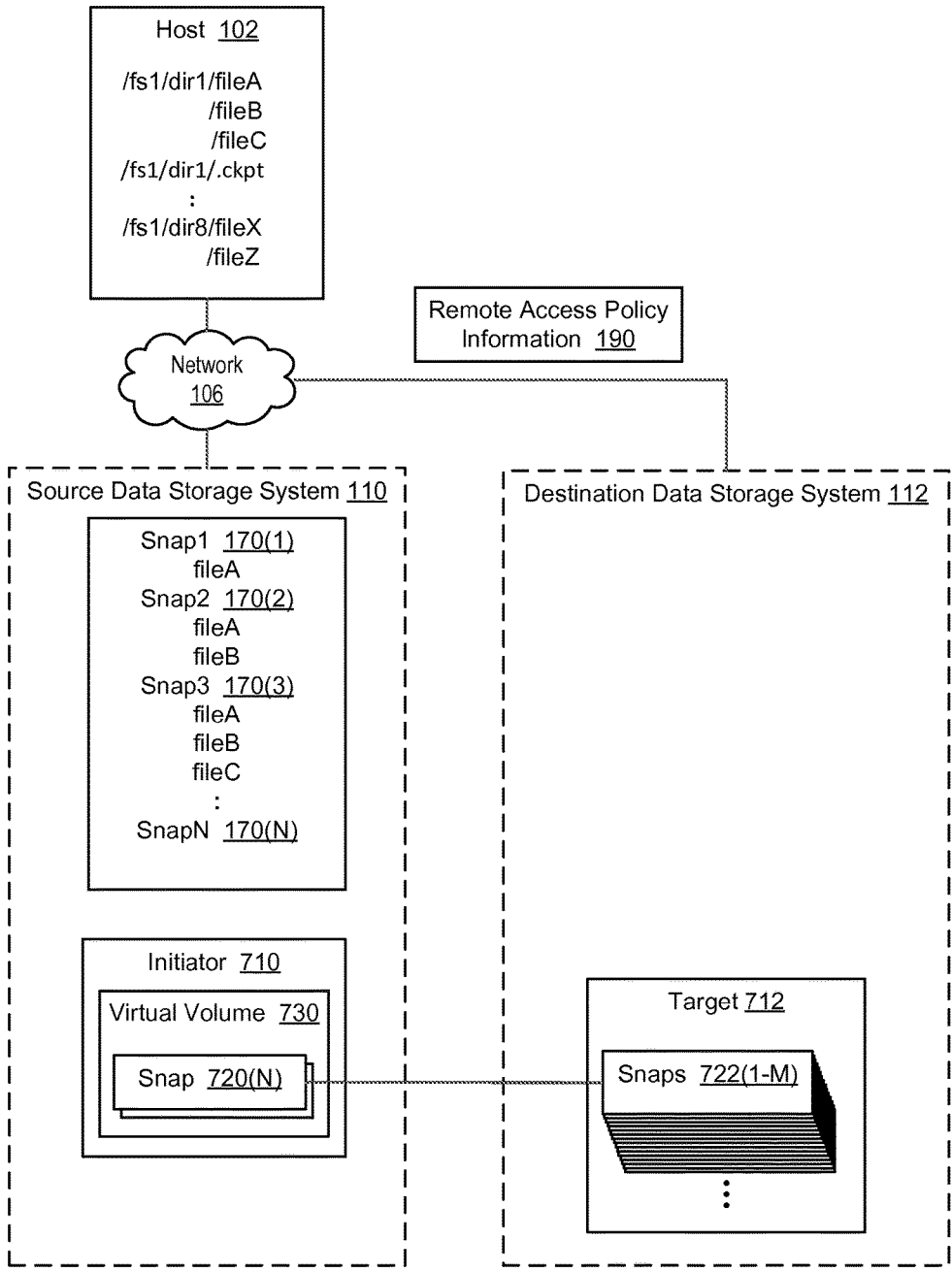
FIG. 8 is a block diagram illustrating example remote snap access operations implementing checkpoint functionality in the electronic environment of FIG. 1.

FIG. 8 illustrates an example embodiment employing techniques described herein for seamlessly and transparently exposing remote snaps thereby providing the ability to perform non-disruptive restore operations. By contrast, conventional systems cannot expose remote snaps to a host such that they appear as local snaps. Rather, such conventional systems either cannot to access the remote snaps. Advantageously, the current techniques also provide a much finer granularity with which to select one or more particular snaps thereby improving system usability for the user. As a result, the techniques described herein significantly reduce application downtime by allowing a user to make use of remote snaps locally.

In this example, the host 102 is shown having a set of files arranged in a directory structure.

As shown in FIG. 8 there may be multiple snaps of a file system. A number of snaps are locally available to the source data storage system 110 to provide a short time period from which to access. For example, 8 snaps may be available where each snap may be taken at a particular time of the day. Thus, a user has access to 8 days' worth of point-in-time snaps of the system. Although more (or less) can be made available, making more available obviously consumes storage space that would otherwise be available for user storage. As a result, it is common to maintain a limited number of local snaps, and as a new snaps is taken, the least recent snap is offloaded to the destination data storage system 112 for long term storage where they can later be recovered. For example, certain compliance regulations require maintaining access to files up to 7 years. Consequently, the number of destination or remote snaps 722(1-N) can reach into the tens of thousands.

The .ckpt functionality provides the ability to restore files from 'local snaps,' that is, snaps stored locally on the source storage system. .ckpt is a hidden directory that exists in most directories in a file system that lists snaps that are associated with the directory in which it resides. When a user at host goes to/fs1/dir1 and executes a .ckpt, it triggers an NFS lookup that looks at all the mounted snaps for the file system to see if they have/fs1/dir1 path and sends back a list of all the snaps that have dir1.

For example, a user navigating in the host 102 path/fs1/dir1, a directory which contains the files fileA, fileB, and fileC, could change directory (cd) into/fs1/dir1/.ckpt and be presented with: /fs1/dir1/.ckpt/Snap1 [directory], /fs1/dir1/.ckpt/Snap2 [directory], and so on. When the user enters the Snap1 directory they would be presented with its point-in-time snaps and within those snaps the directory views of/fs1/dir1 that correspond to those snapshots. Each snap is an independent file system view. The list is used to dynamically and virtually create a .ckpt directory in every directory of the file system on demand.

For instance, consider a system where a snap is taken each day, and 8 snaps 170(1)-170(8) are stored at the local source data storage system 110. When the 9th snap is taken, snap recycle logic (not shown) recycles the least recent snap where it gets archived on the destination data storage system 112 as a remote snap 722(N). The process continues, storing the most recent snap and archiving the least recent snap. At some point, a user identifies an issue with fileB (e.g., corrupted, deleted, etc.) and wants to recover the file using an earlier copy of the file. Here, the user could cd/fs1/dir/.ckpt, execute an ls (list) command to view available snaps.

The result would list Snap2 170(2) and Snap 3 170(3) since they contain fileB; however, Snap1 170(1) would not be listed as fileB did not exist when the Snap1 170(1) was taken. The user can view snap file name date information to identify potential snaps of interest. In this example, because 8 snaps are stored a user can view snaps from the 8 most recent days. With conventional methods, if the file of interest is older than 8 days, a remote snap 722(N) could be restored only by performing a full restore operation. Such remote snap restore operations can be a lengthy process that can take hours to complete, causing significant application down time and inconvenience.

By contrast, employing techniques described herein, remote snaps can be made to appear as local snaps using virtual volume 730 without requiring the system downtime and inconvenience of conventional methods. Various example embodiments implement the techniques described herein in conjunction with .ckpt functionality to seamlessly and transparently present remote snaps as local snaps. Thus, a user has access to tens of thousands of remote snaps that can be used in the same way, and with the same feature set and functionality, as local snaps.

In one example embodiment, when a cd into the .ckpt directory and is command is executed, all local snaps 170(N) and remote snaps 722(M) containing the directory of interest are listed. If the snap of interest is a remote snap, a user can simply cd into that remote snap to examine and retrieve the desired file(s).

In an alternative example embodiment, the technique can create a separate .remoteckpt directory for listing the remote snaps. In this way, a user can distinguish and operate local snaps separate from remote snaps. To access snaps of interest, a user can cd .ckpt to access local snaps or cd .remoteckpt to access remote snaps. Because remote snaps may respond slower than local snaps, a user can examine local snaps first with a performance expectation consistent with local file operations and if necessary, can examine snaps identified as remote snaps 722(N) with the expectation that there may be a performance difference.

Figure 9:
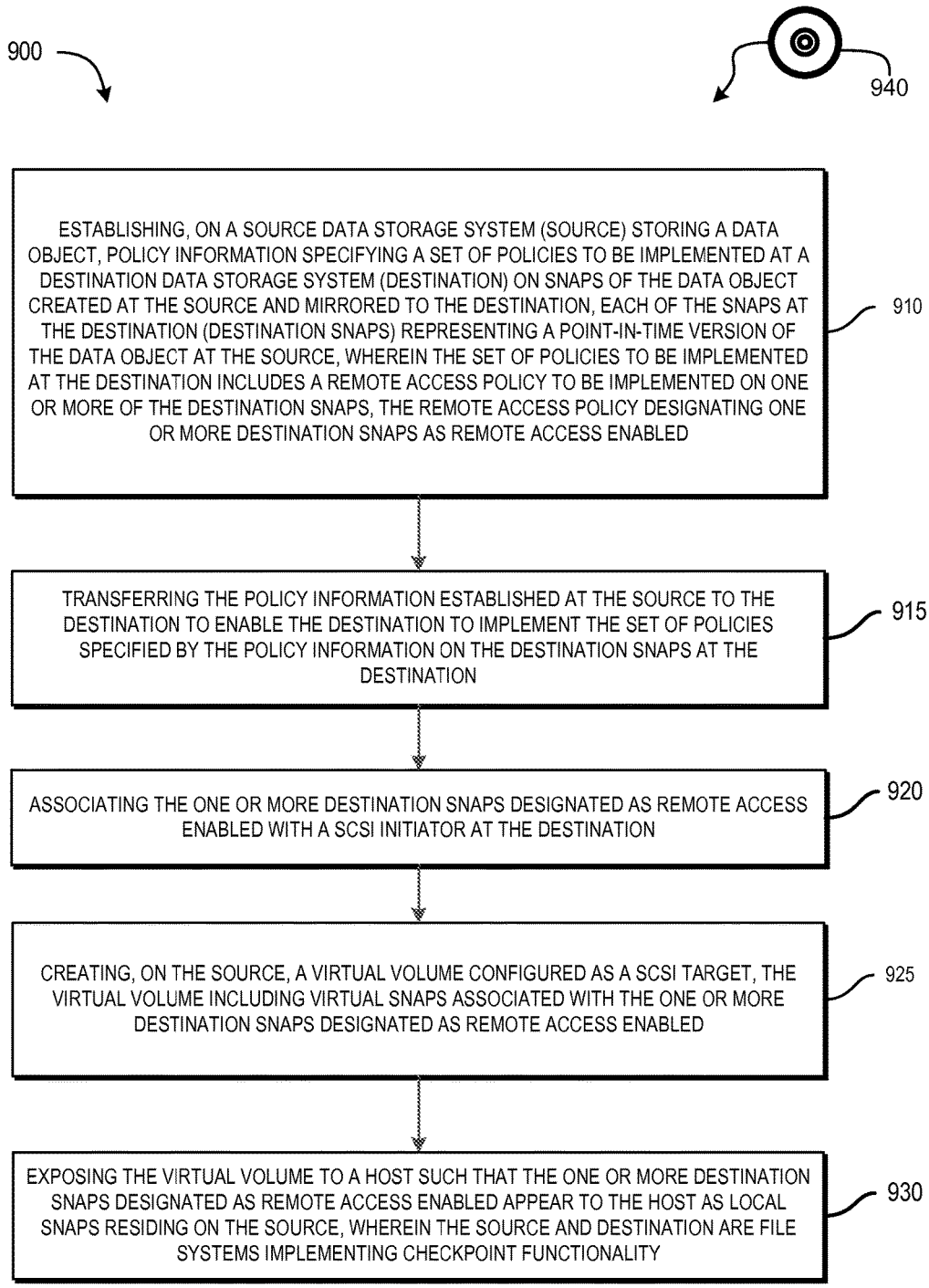
FIG. 9 is a flow chart illustrating a method of carrying out the improved technique in the electronic environment of FIG. 1.

FIG. 9 illustrates an example method 900 for managing snaps of data objects and provides a summary of some of the material presented above. The process 900 may be performed by the software constructs described in connection with FIGS. 1-7, which reside in the respective memories 130 and 132 of the SPs 120 and 122 and are run by the set of respective processing units 123 and 126. The various acts of the process 900 may be ordered in any suitable way. Accordingly, embodiments may be constructed in which acts are performed in orders different from those illustrated, which may include performing some acts simultaneously, even though the acts are shown as sequential in the illustrated embodiments.

At 910, policy information is established on a source data storage system (source) storing a data object. The policy information specifies a set of policies to be implemented at a destination data storage system (destination) on snaps of the data object created at the source and mirrored to the destination. Each of the snaps at the destination (destination snaps) represents a point-in-time version of the data object at the source. For example, a policy may dictate that destination snaps are kept on the destination for 7 years (e.g., legal compliance requirements), while snaps on the source need only be kept for 8 days. In this way, the destination acts as a volume-based archive of snaps of the data object.

The set of policies to be implemented at the destination include a remote access policy. The remote access policy is applied to one or more of the destination snaps. The policy can include information used to identify which destination snaps are enabled for remote access, that is, accessible from the source system.

At 915, the policy information established at the source is transferred to the destination. With this information, the destination is enabled to implement the set of policies specified by the policy information on the destination snaps at the destination. At 920, one or more destination snaps designated as remote access enabled are associated with a SCSI target at the destination. At 925, a virtual volume is created on the source and is configured as a SCSI initiator. As a result, the virtual volume's virtual snaps are associated with the one or more destination snaps that were designated as remote access enabled. At 930, the virtual volume is exposed to a host such that the one or more snaps residing on the destination and designated as remote access enabled appear to the host as local snaps residing on the source.

Improved techniques for managing snaps of a data object hosted by the source involve specifying, by the source, a set of policies for snaps of the data object that are stored on the destination. Advantageously, the improved techniques allow a host to, via file mechanisms such as .ckpt directories, transparently access a destination storage object at a source storage system for performing non-disruptive restore operation using, for example. Such control promotes various efficiencies and system performance improvements as described in connection with FIG. 8 that would not be easily realized if a host could not access destination storage objects from a source.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

Further still, the improvement or portions thereof may be embodied as a non-transient computer-readable storage medium, such as a magnetic disk, magnetic tape, compact disk, DVD, optical disk, flash memory, Application Specific Integrated Circuit (ASIC), Field Programmable Gate Array (FPGA), and the like (shown by way of example as medium 940 in FIG. 9). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

As used throughout this document, the words "comprising," "including," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Although certain embodiments are disclosed herein, it is understood that these are provided by way of example only and the invention is not limited to these particular embodiments.

Those skilled in the art will therefore understand that various changes in form and detail may be made to the embodiments disclosed herein without departing from the scope of the invention. It should again be emphasized that the technique implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

Furthermore, as will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the FIGS. illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the FIGS. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), Flash memory, an optical fiber, a portable compact disc read-only memory (CD-ROM), an optical storage device, digital versatile disc ROM (DVD-ROM) a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for managing snaps of data objects, the method comprising:
    establishing, on a source data storage system ("source") storing a data object, policy information specifying a set of policies to be implemented at a destination data storage system ("destination") on snaps of the data object created at the source and mirrored to the destination, each of the snaps at the destination ("destination snaps") representing a point-in-time version of the data object at the source, wherein the set of policies to be implemented at the destination includes a remote access policy to be implemented on one or more of the destination snaps, the remote access policy designating one or more destination snaps as remote access enabled;

transferring the policy information established at the source to the destination to enable the destination to implement the set of policies specified by the policy information on the destination snaps at the destination;

associating the one or more destination snaps designated as remote access enabled with a SCSI target at the destination;

creating, on the source, a virtual volume configured as a SCSI initiator, the virtual volume including virtual snaps associated with the one or more destination snaps designated as remote access enabled; and exposing the virtual volume to a host such that the one or more destination snaps designated as remote access enabled appear to the host as local snaps residing on the source using checkpoint functionality at the source, wherein the source and destination are file systems implementing the checkpoint functionality.

2. The method of claim 1, wherein the set of policies to be implemented at the destination includes a retention policy to be implemented on one or more of the destination snaps, the retention policy specifying a length of time that the destination snaps are to be retained at the destination, and wherein the method further comprises retaining, by the destination, a set of the snaps at the destination for a length of time not less than the length of time specified by the retention policy.

3. A method as in claim 2, wherein the data object is a file system, wherein the policy information includes snap-specific policy information transmitted from the source to the destination for respective destination snaps, and wherein the snap-specific policy information for a particular destination snap includes a file system consistency check policy, the file system consistency check policy specifying whether the destination is to perform a file system consistency check on the destination snap to verify that file system metadata of the destination snap is internally consistent.

4. A method as in claim 2, further comprising:

receiving, by the source, a result of a file system consistency check performed by the destination on the particular destination snap, the result indicating a set of errors in the metadata of the particular destination snap; and updating the data object at the source to correct the set of errors indicated in the result of a file system consistency check performed by the destination.

5. A method as in claim 2, further comprising:

receiving, by the source, a result of a file system consistency check performed by the destination on the destination snap, the result indicating that the destination snap is in a consistent state, and upon a detection of improper behavior of the data object at the source, restoring the data object at the source from the destination snap at the destination.

6. A system for managing snaps of data objects, the system comprising a storage processor and circuitry configured to:

establish, on a source data storage system ("source") storing a data object, policy information specifying a set of policies to be implemented at a destination data storage system ("destination") on snaps of the data object created at the source and mirrored to the destination, each of the snaps at the destination ("destination snaps") representing a point-in-time version of the data object at the source, wherein the set of policies to be implemented at the destination includes a remote access policy to be implemented on one or more of the destination snaps, the remote access policy designating one or more destination snaps as remote access enabled;

transfer the policy information established at the source to the destination to enable the destination to implement the set of policies specified by the policy information on the destination snaps at the destination;

associate the one or more destination snaps designated as remote access enabled with a SCSI target at the destination;

create, on the source, a virtual volume configured as a SCSI initiator, the virtual volume including virtual snaps associated with the one or more destination snaps designated as remote access enabled; and expose the virtual volume to a host such that the one or more destination snaps designated as remote access enabled appear to the host as local snaps residing on the source using checkpoint functionality at the source, wherein the source and destination are file systems implementing the checkpoint functionality.

7. The system of claim 6, wherein the set of policies to be implemented at the destination includes a retention policy to be implemented on one or more of the destination snaps, the retention policy specifying a length of time that the destination snaps are to be retained at the destination, and wherein the system is further configured to retain, by the destination, a set of the snaps at the destination for a length of time not less than the length of time specified by the retention policy.

8. A system as in claim 7, wherein the data object is a file system, wherein the policy information includes snap-specific policy information transmitted from the source to the destination for respective destination snaps, and wherein the snap-specific policy information for a particular destination snap includes a file system consistency check policy, the file system consistency check policy specifying whether the destination is to perform a file system consistency check on the destination snap to verify that file system metadata of the destination snap is internally consistent.

9. A system as in claim 7, further configured to:

receive, by the source, a result of a file system consistency check performed by the destination on the particular destination snap, the result indicating a set of errors in the metadata of the particular destination snap; and update the data object at the source to correct the set of errors indicated in the result of a file system consistency check performed by the destination.

10. A system as in claim 7, further configured to:

receive, by the source, a result of a file system consistency check performed by the destination on the destination snap, the result indicating that the destination snap is in a consistent state, and upon a detection of improper behavior of the data object at the source, restore the data object at the source from the destination snap at the destination.

11. A computer program product residing on a non-transitory computer readable medium having a plurality of instructions stored thereon which, when executed by a processor, cause the processor to perform operations comprising:

establishing, on a source data storage system ("source") storing a data object, policy information specifying a set of policies to be implemented at a destination data storage system ("destination") on snaps of the data object created at the source and mirrored to the destination, each of the snaps at the destination ("destination snaps") representing a point-in-time version of the data object at the source, wherein the set of policies to be implemented at the destination includes a remote access policy to be implemented on one or more of the destination snaps, the remote access policy designating one or more destination snaps as remote access enabled;

transferring the policy information established at the source to the destination to enable the destination to implement the set of policies specified by the policy information on the destination snaps at the destination;

associating the one or more destination snaps designated as remote access enabled with a SCSI target at the destination;

creating, on the source, a virtual volume configured as a SCSI initiator, the virtual volume including virtual snaps associated with the one or more destination snaps designated as remote access enabled; and exposing the virtual volume to a host such that the one or more destination snaps designated as remote access enabled appear to the host as local snaps residing on the source using checkpoint functionality at the source, wherein the source and destination are file systems implementing the checkpoint functionality.

* * * * *